United States Patent Office 3,231,574
Patented Jan. 25, 1966

3,231,574
PIPERAZINE DERIVATIVES
Wallace Glenn Strycker, Goshen, and Shin Hayao, Elkhart, Ind., assignors to Miles Laboratories, Inc., Elkhart, Ind., a corporation of Indiana
No Drawing. Filed Mar. 19, 1964, Ser. No. 353,273
8 Claims. (Cl. 260—268)

This invention relates to tetrazole derivatives. In one of its more particular aspects this invention relates to piperazylalkyl derivatives of tetrazoles having valuable pharmacological properties.

The compounds of this invention can be represented by means of the structural formula:

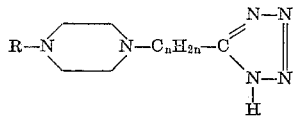

in which R represents an aromatic ring such as a benzene or substituted benzene ring or a heterocyclic ring such as pyridyl, quinolyl, thienyl, or furyl or the substituted derivatives thereof and $n$ is an integer of from 1 to 4. Representative of these compounds is 5-[2-(4-phenyl-1-piperazyl)ethyl]-tetrazole, which can be represented by the formula given above wherein R is phenyl and $n$ is 2.

The compounds of this invention can be furnished in the form of various salts, for example, salts of mineral acids such as the hydrochloride. The tetrazole compounds of this invention can also be isolated as salts of various organic acids such as the oxalate or maleate or as internal salts. In general salts which are pharmacologically acceptable are used.

The compounds of this invention can be conveniently prepared by reacting the appropriate nitrile with an azide salt of a monovalent cation such as lithium azide, sodium azide, potassium azide, ammonium azide, or a substituted ammonium azide. This reaction sequence may be illustrated in accordance with the following equation:

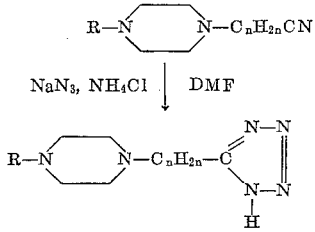

wherein R and $n$ have the significance ascribed above.

In carrying out the reaction for the preparation of the tetrazoles of this invention, it is desirable to utilize a suitable solvent and catalyst. For the solvent there may be used any organic solvent which will facilitate the reaction, that is, any ionizing solvent in which the reactants are soluble. Dimethylformamide, for example, is a suitable solvent. For the catalyst it is preferred to use an ammonium compound such as ammonium chloride or an amine hydrochloride. Other Lewis acid catalysts, however, may be used. The reaction conditions are not particularly critical although refluxing the reaction mixture for an extended period of time, for example, for about 10 to 24 hours has been found advantageous. The product is formed as an internal salt and can be converted to other suitable salts by reacting the originally formed salt with the desired acid.

The novel piperazylalkyltetrazole derivatives of this invention are useful as anti-hypertensive agents.

The invention will be better understood by reference to the following examples which illustrate in detail some of the compounds which comprise this invention and methods for their production. However, the invention is not to be construed as limited thereby in spirit or in scope. It will be apparent to those skilled in the art that numerous modifications in materials and methods can be adopted without departing from the invention.

EXAMPLE 1

5-[2-(4-phenyl-1-piperazyl)ethyl]tetrazole dihydrochloride

A mixture of 1-(2-cyanoethyl)-4-phenylpiperazine (43.0 g., 0.2 mole), sodium azide (28.6 g., 0.44 mole) and ammonium chloride (33.0 g., 0.6 mole) in 200 ml. of dimethylformamide (DMF) was stirred under reflux for 21 hours to give a dark brown solution. The solvent was removed in vacuo to give a mixture of dark liquid and inorganic salt. It was dissolved in water, filtered and extracted with chloroform twice and once with either. The combined extracts were dried and saturated with dry hydrogen chloride to give a dark oil which became a crystalline solid when a small amount of absolute ethanol was added. The light brown hydrochloride melted at 204°–209° C. (dec.), yield 21.9 g. The dark filtrate deposited an additional 5.1 g. of brown hydrochloride of M.P. 208°–210° (dec.). The total yield of crude solid was 27.0 g. (57.3%). This was recrystallized from methanol containing hydrogen chloride to give a colorless solid of M.P. 220°–221° (dec.), yield 20.4 g. It was 1-phenylpiperazine dihydrochloride from analytical data and infrared spectrum.

Analysis.—Calcd. for $C_{10}H_{14}N_2 \cdot 2HCl$: N, 11.9; HCl, 31.2. Found: N, 11.3; HCl, 30.4.

A sample (5 g.) was treated with tosyl chloride (4.2 g.) under Schotten-Baumann conditions and the crude sulfonamide was recrystallized from aqueous methanol-DMF to give colorless needles of M.P. 197°–198°, yield 4.8 g. A mixed M.P. with an authentic sample prepared from 1-phenylpiperazine and tosyl chloride was not depressed. 1-phenyl-4-p-toluenesulfonylpiperazine gave correct analysis.

Analysis.—Calcd. for $C_{17}H_{20}N_2O_2S$: N, 8.86. Found: N, 8.82.

Meanwhile, the dark aqueous layer was evaporated in vacuo to leave a mixture of dark oil and inorganic salt. It was heated in methanol and insoluble inorganic salt (22.5 g.) was filtered off. The dark filtrate was saturated with dry hydrogen chloride to give a small amount of inorganic salt which was discarded. The methanolic solution was diluted with ethyl acetate to give a tan hydrochloride on scratching, yield 21.7 g. (32.8%), M.P. 200°–202° (dec.). It was recrystallized from aqueous methanol containing hydrogen chloride (charcoal) to give a colorless solid of M.P. 200°–201° (dec.), yield 18.9 g. $\lambda_{max.}^{CH_3OH}$: 207 m$\mu$ ($\epsilon$, 18,450), 243.5 m$\mu$ ($\epsilon$, 13,100), 281.5 m$\mu$ ($\epsilon$, 1,220).

Analysis.—Calcd. for $C_{13}H_{18}N_6 \cdot 2HCl$: C, 47.2; H, 6.05; N, 25.4; Cl, 21.4; neut. equiv. 110.3. Found: C, 47.2; H, 6.31; N, 25.6; Cl, 21.2; neut. equiv. 110.5.

EXAMPLE 2

5-[2-(4-p-fluorophenyl-1-piperazyl)ethyl]tetrazole dihydrochloride

A mixture of 1-(2-cyanoethyl)-4-p-fluorophenylpiperazine (50.1 g., 0.215 mole), sodium azide (29.4 g., 0.4 mole) and ammonium chloride (24.0 g., 0.45 mole) in 200 ml. of DMF was refluxed with stirring for 7 hours to give a dark brown mixture which was filtered while hot and the inorganic salt was washed with acetone. The dark filtrate was concentrated in vacuo to a smaller volume. Water was added to the residue and the solution was concentrated again. Water was added to the residue and made basic with aqueous sodium hydroxide to give a clear solution which was extracted twice with chloroform and once with ether. The combined extracts were dried. The solvent was removed in vacuo and the remaining sirup was dissolved in methanol and treated with dry hydrogen chloride to give 13.1 g. of solid. It was recrystallized from aqueous 2-propanol-ethyl acetate mixture to give a hydrochloride of M.P. 210°–217°, yield 7.3 g. It was suspended in 20% sodium hydroxide solution and tosyl chloride (6.5 g., 0.034 mole) was added. The mixture with a little benzene was shaken vigorously to give a solid mass. After recrystallization from methanol-DMF 1-p-fluorophenyl-4-p-toluenesulfonylpiperazine melted at 185°–187°, yield 8.8 g.

Analysis.—Calcd. for $C_{17}H_{19}FN_2O_2S$: N, 8.39. Found: N, 8.21.

Meanwhile the aqueous alkaline solution was neutralized to pH 6 with dilute acetic acid and the clear solution was evaporated to dryness in vacuo to leave a tan solid mass. It was extracted with hot absolute ethanol and the insoluble solid was discarded. The dark brown filtrate was concentrated to a smaller volume to give more solid which was also discarded. The dark filtrate was saturated with dry hydrogen chloride to give a light tan solid of M.P. 189°–190° (dec.), yield 43.3 g. It was purified by dissolving the solid in hot aqueous methanol, filtered and saturated with dry hydrogen chloride to precipitate the hydrochloride. This process was repeated four times to obtain the pure dihydrochloride, M.P. 194°–196° (dec.), yield 23.0 g.

Analysis.—Calcd. for $C_{13}H_{17}FN_6 \cdot 2CHl$: C, 44.7; H, 5.45; N, 24.1. Found: C, 44.7, 44.3; H, 5.03, 5.49; N, 23.8.

EXAMPLE 3

5-[2-(4-m-trifluoromethylphenyl-1-piperazyl)ethyl] tetrazole dihydrochloride A mixture of 1-m-trifluoromethylphenyl-4-(2-cyanoethyl)piperazine (59.7 g., 0.211 mole), sodium azide (30.4 g., 0.465 mole) and ammonium chloride (25.0 g., 0.465 mole) in 200 ml. of DMF was refluxed with vigorous stirring for 15 hours. The inorganic salt was filtered off while hot and the dark solution was concentrated in vacuo. The residue was dissolved in water and made alkaline with sodium hydroxide solution. The basic solution was extracted with chloroform to remove the starting material and the dark aqueous solution was neutralized with dilute acetic acid to pH 6. The neutral solution was evaporated to dryness in vacuo to leave a brown solid mass. It was stirred in hot methanol, filtered and the dark brown filtrate was saturated with dry hydrogen chloride, to give a light tan solid of M.P. >250°, yield 27.1 g. (mostly inorganic salt). The dark filtrate was again saturated with dry hydrogen chloride to give a second crop which came out slowly on scratching, yield 26.4 g., M.P. 184°–188° (dec.). It was recrystallized twice by dissolving it in hot methanol and treating with charcoal. It was then saturated with dry hydrogen chloride and ethyl acetate was added. The colorless product melted at 184°–186° (dec.), yield 23.2 g.

Analysis.—Calcd. for $C_{14}H_{17}F_3N_6 \cdot 2CHl$: C, 42.2; H, 4.76; N, 21.0. Found: C, 42.3; H, 4.78; N, 21.2.

EXAMPLE 4

A. 5-(4-phenyl-1-piperazylmethyl)tetrazole

A mixture of 1-cyanomethyl-4-phenylpiperazine (40.2 g., 0.2 mole), sodium azide (14.3 g., 0.22 mole) and ammonium chloride (11.8 g., 0.22 mole) in 200 ml. of DMF was refluxed for 15 hours with stirring. The hot reaction mixture was filtered to remove inorganic salt and the filtrate was evaporated in vacuo to leave a tan solid mass. Water was added to the mixture and the solid was collected on a filter, yield 22.2 g. (45.5%), M.P. >250°. It was recrystallized twice from aqueous DMF to give a colorless solid of M.P. 271° (dec.) with softening at 265°, yield 16.6 g.

Analysis.—Calcd. for $C_{12}H_{16}N_6$: C, 59.0; H, 6.55; N, 34.5. Found: C, 58.0; H, 6.43; N, 35.0.

B. 5-(4-phenyl-1-piperazylmethyl)tetrazole dihydrochloride

The solid was suspended in methanol and treated with dry hydrogen chloride to give a colorless solid of M.P. 208°–210° (dec.), yield 21.6 g. It was dissolved in hot aqueous methanol, treated with dry hydrogen chloride and the solid that separated was collected, yield 18.4 g., M.P. 200°–202° (dec.).

Analysis.—Calcd. for $C_{12}H_{16}N_6 \cdot 2HCl$: C, 45.4; H, 4.90; N, 26.5. Found: C, 44.8; H, 4.90; N, 26.4.

EXAMPLE 5

5-[3-(4-phenyl-1-piperazyl)propyl]tetrazole

A mixture of 4-phenyl-1-(3-cyanopropyl)piperazine (71 g., 0.31 mole), sodium azide (40.3 g., 0.62 mole), ammonium chloride (33.2 g., 0.62 mole) and 200 ml. of DMF was heated under reflux with stirring for 20 hours. The solvent was removed in vacuo and the concentrate was suspended in water to form a solid. The solid was collected and recrystallized from an aqueous methanol-ether solution. Yield 32.5 g. (38.5%), M.P. 188°–189° (dec.).

Analysis.—Calcd. for $C_{14}H_{20}N_6$: C, 61.76; H, 7.35; N, 30.88. Found: C, 61.61; H, 7.22; N, 30.64.

EXAMPLE 6

5-[3-(4-m-chlorophenyl-1-piperazyl)propyl]tetrazole

A mixture of 1-(3-cyanopropyl)-4-m-chlorophenylpiperazine (57.7 g., 0.219 mole), ammonium chloride (26.2 g., 0.49 mole) and sodium azide (31.9 g., 0.49 mole) in 200 ml. of DMF was refluxed for 17 hours with stirring to give a mixture of dark brown solution and inorganic salt. The solvent was removed in vacuo and the pasty residue was treated with water. The water insoluble solid was collected by suction, washed with water and with ether. The light brown solid weighed 54.8 g. (81.6%), M.P. 160°–162°. It was recrystallized twice from aqueous methanol-ether to give 27.6 g. of a pale yellow solid of M.P. 165°–166°.

Analysis.—Calcd. for $C_{14}H_{19}ClN_6$: C, 54.7; H, 6.20; N, 27.4. Found: C, 54.7; H, 6.47; N, 27.4.

EXAMPLE 7

A. 5-[4-(4-phenyl-1-piperazyl)butyl]tetrazole trihydrochloride

A mixture of 1-(4-cyanobutyl)-4-phenylpiperazine (59.5 g., 0.245 mole), sodium azide (35.8 g. 0.55 mole) and ammonium chloride (29.5 g., 0.55 mole) in 200 ml. of DMF was refluxed for 18 hours with stirring. The inorganic salt was removed by filtration and the dark brown solution was concentrated in vacuo. The dark residue was treated with water to give a dark oily layer which could be extracted with chloroform. The solvent was removed in vacuo again to leave a dark sirup which partly solidified on standing. The residue was heated in methanol and the dark clear solution was saturated with dry hydrogen chloride to give a light tan solid which was collected by suction, washed with ethyl acetate-ether and dried in air, yield 77.8 g., M.P. 188°–195° (dec.). It was dissolved in hot methanol, filtered and saturated with dry hydrogen chloride to give a colorless solid which was dried in vacuo over sodium hydroxide pellets, yield 73.6 g., M.P. 198°–199° (dec.). The analysis showed that the product was a trihydrochloride.

*Analysis.*—Calcd. for $C_{15}H_{22}N_6 \cdot 3HCl$: C, 45.5; H, 6.32; N, 21.2; Cl. 26.9. Found: C, 45.7; H, 6.20; N, 21.1; Cl, 26.0.

B. *5-[4-(4-phenyl-1-piperazyl)butyl]tetrazole hydrochloride*

This trihydrochloride was dissolved in hot aqueous 2-propanol and filtered. Ether was added to give a colorless crystalline solid of M.P. 195°–196° (dec.), yield 46.8 g. (monohydrochloride).

*Analysis.*—Calcd. for $C_{15}H_{22}N_4 \cdot HCl$; C, 55.7; H, 7.12; N, 26.0. Found: C, 55.6; H, 7.12; N, 26.0.

The various compounds described in the above examples are shown in Table 1 with their physical and chemical characteristics.

TABLE 1

| Ex. No. | Chemical name and structure | Melting point, °C. | Formula | Calculated C | Calculated H | Calculated N | Found C | Found H | Found N |
|---|---|---|---|---|---|---|---|---|---|
| 1 | 5-[2-(4-phenyl-1-piperazyl)ethyl]tetrazole dihydrochloride | 200–201 (dec.) | $C_{13}H_{18}N_6 \cdot 2HCl$ | 47.2 | 6.05 | 25.4 | 47.2 | 6.31 | 25.6 |
| 2 | 5-[2-(4-p-fluorophenyl-1-piperazyl)ethyl]tetrazole | 194–196 (dec.) | $C_{13}H_{17}FN_6 \cdot 2HCl$ | 44.7 | 5.45 | 24.1 | {44.7, 44.3} | {5.03, 5.49} | 23.8 |
| 3 | 5-[2-(4-m-trifluoromethylphenyl-1-piperazyl)ethyl]-tetrazole dihydrochloride. | 184–186 (dec.) | $C_{14}H_{17}F_3N_6 \cdot 2HCl$ | 42.2 | 4.76 | 21.0 | 42.3 | 4.78 | 21.2 |
| 4A | 5-(4-phenyl-1-piperazylmethyl)tetrazole | 271 (dec.) | $C_{12}H_{16}N_6$ | 59.0 | 6.55 | 34.5 | 58.0 | 6.43 | 35.0 |
| 4B | 5-(4-phenyl-1-piperazylmethyl)tetrazole dihydrochloride | 200–202 (dec.) | $C_{12}H_{16}N_6 \cdot 2HCl$ | 45.4 | 4.90 | 26.5 | 44.8 | 4.90 | 26.4 |
| 5 | 5-[3-(4-phenyl-1-piperazyl)propyl]tetrazole | 188–189 (dec.) | $C_{14}H_{20}N_6$ | 61.76 | 7.35 | 30.88 | 61.61 | 7.22 | 30.64 |
| 6 | 5-[3-(4-m-chlorophenyl-1-piperazyl)propyl]tetrazole | 165–166 | $C_{14}H_{19}ClN_6$ | 54.7 | 6.20 | 27.4 | 54.7 | 6.47 | 27.4 |
| 7A | 5-[4-(4-phenyl-1-piperazyl)butyl]tetrazole trihydrochloride. | 198–199 (dec.) | $C_{15}H_{22}N_6 \cdot 3HCl$ | 45.5 | 6.32 | 21.2 | 45.7 | 6.20 | 21.1 |
| 7B | 5-[4-(4-phenyl-1-piperazyl)butyl]tetrazole hydrochloride | 195–196 (dec.) | $C_{15}H_{22}N_6 \cdot HCl$ | 55.7 | 7.12 | 26.0 | 55.6 | 7.12 | 26.0 |

In summary this invention relates to certain piperazylalkyl tetrazole derivatives, as defined by the structural formula given above, which have been found to be useful anti-hypertensive agents.

What is claimed is:

1. A compound selected from the group consisting of compounds of the formula:

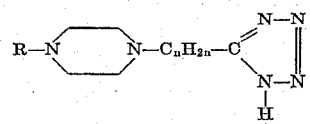

wherein R is a member selected from the group consisting of phenyl and substituted phenyl wherein the substituents are selected from the group consisting of chloro, fluoro and trifluoromethyl and $n$ is an integer of about from 1 to 4 and salts of said compounds with pharmacologically acceptable anions.

2. 5-[2-(4-phenyl-1-piperazyl)ethyl]tetrazole.
3. 5-[2-(4-p-fluorophenyl-1-piperazyl)ethyl]tetrazole.
4. 5-[2-(4-m-trifluoromethylphenyl-1-piperazyl)ethyl]tetrazole.
5. 5-(4-phenyl-1-piperazylmethyl)tetrazole.
6. 5-[3-(4-phenyl-1-piperazyl)propyl]tetrazole.
7. 5-[3-(4-m-chlorophenyl-1-piperazyl)propyl]tetrazole.
8. 5-[4-(4-phenyl-1-piperazyl)butyl]tetrazole.

References Cited by the Examiner

UNITED STATES PATENTS

| | | | |
|---|---|---|---|
| 2,695,295 | 11/1954 | Swain | 260—268 |
| 2,735,852 | 2/1956 | Herbst | 260—308 |
| 2,852,515 | 9/1958 | Elpern | 260—308 |
| 2,986,573 | 5/1961 | Topliss et al. | 167—65 |
| 2,987,442 | 6/1961 | McLean et al. | 167—65 |
| 2,997,474 | 8/1961 | Janssen | 260—268 |

OTHER REFERENCES

Karrer: Organic Chemistry, Fourth English Edition, page 803, Elsevier Publishing Co., Inc., New York (1950).

NICHOLAS S. RIZZO, *Primary Examiner.*